United States Patent [19]

Biegel

[11] Patent Number: 4,775,197
[45] Date of Patent: Oct. 4, 1988

[54] RAILROAD CAR WITH BRAKE SYSTEM WHICH APPLIES LESS BRAKING WHEN EMPTY THAN WHEN LOADED

[75] Inventor: Robert A. Biegel, Dolton, Ill.

[73] Assignee: Thrall Car Manufacturing Company, Chicago Heights, Ill.

[21] Appl. No.: 127,557

[22] Filed: Dec. 3, 1987

Related U.S. Application Data

[63] Continuation-in-part of Ser. No. 795,507, Nov. 6, 1985, abandoned.

[51] Int. Cl.[4] .................................................. B60T 8/20
[52] U.S. Cl. ..................................................... 303/22.2
[58] Field of Search .............. 303/22 A, 22 R, 23 A, 303/23 R, 56

[56] References Cited

U.S. PATENT DOCUMENTS

| | | | |
|---|---|---|---|
| 3,338,639 | 8/1967 | Carothers | 303/22 R |
| 3,341,257 | 9/1967 | Weber | 303/22 R |
| 3,612,621 | 10/1971 | Scott | 303/22 R |
| 3,671,086 | 6/1972 | Scott | 303/23 R |

Primary Examiner—Duane A. Reger
Attorney, Agent, or Firm—Marshall, O'Toole, Gerstein, Murray & Bicknell

[57] ABSTRACT

A railroad freight car comprising a freight-carrying first elongated body supported at one end by a first truck and at the other end by a second truck; each truck having a plurality of wheels and carrying air pressure operated braking apparatus for braking the wheels; the air pressure operated braking apparatus on the first truck including a pressurized air line having an air pressure sensor/changeover valve which governs the braking pressure applied only to the wheels of the first truck; the first truck having a bolster, spring-supported at each end by wheel-containing side frames, whereby the bolster is lowered relative to the frame when the elongated body condition varies from empty to loaded; a base mounting the air pressure sensor/changeover valve to the bolster; and, the valve having an arm responsive to change in height of the bolster relative to the frame to decrease the air pressure to the brake apparatus from a high pressure, when the elongated body is loaded, to a lower pressure when the elongated body has an empty load condition to thereby apply a predetermined high braking force to the wheels when the elongated body is loaded and apply a decreased or lower braking force to the wheels when an empty condition exists.

9 Claims, 4 Drawing Sheets

RAILROAD CAR WITH BRAKE SYSTEM WHICH APPLIES LESS BRAKING WHEN EMPTY THAN WHEN LOADED

This application is a continuation-in-part of application Ser. No. 795,507, filed Nov. 6, 1985, abandoned.

This invention relates to railroad cars with air brake apparatus. More particularly, this invention is concerned with an improved railroad car having air brake apparatus which increases or decreases the braking action applied to the wheels with increased or decreased lading load applied to one or more of the trucks.

BACKGROUND OF THE INVENTION

The usual railroad car in use in the United States has an elongated body supported at each end by a truck containing wheels which ride on rails. Such cars in varying numbers are coupled together to make a train pulled by one or more locomotives. Braking railroad trains is almost always done by means of air brake apparatus, mounted on the individual cars, controlled by the engineer by means of an air line extending the length of the train and in communication with the braking apparatus on each car.

Many trains contain random consists of cars which are empty i.e. contain no lading, or are partially or fully loaded with lading. When the train engineer brakes such a train it is undesirable to have equal braking pressure applied to all the cars because thereby some may be over-braked and others under-braked. When over-braked, such as can occur when a car is empty or lightly loaded, the braked wheels may lock, stop rolling and slide along the track thereby causing flat areas to form on the wheels. Under-braking of wheels is also undesirable because this reduces the overall braking action applied to the train and makes some cars brake more than desirable with excessive wear on the brake shoes.

Because of the desirability of applying a predetermined braking force to wheels of loaded cars, and decreased braking force to empty cars, it is common to mount on the car body a single control valve system which regulates the pressure of air fed to the braking apparatus on the trucks at both ends of the car so that when the car is loaded, the air pressure is increased and causes a corresponding increase in braking force on the wheels. When the car is unloaded or empty, a reduction in air pressure occurs and braking force is reduced to a predetermined value.

While a braking control system as described has been found useful on conventional railroad cars of heavy construction it has not given precision braking control because the valve action requires a displacement of about 1.5 inches or so between the car body and the truck frame. This distance could not be significantly reduced due to car rolling which would activate the valve prematurely.

Another disadvantage of the described braking control system is that it incorrectly assumed the load on each of the two car trucks would always be equal whether the car was empty or partially or fully loaded. In some instances the car end where the control valve is located would be lighter or heavier than the other end, leading to incorrect braking at the end away from the valve.

In recent years major efforts have been made to lighten or reduce the weight of railroad cars. The braking of such cars, particularly when empty, requires less force than heavier cars so that braking apparatus and control systems which were useful for heavier cars would more likely over-brake the lighter cars and cause the wheels to lock and slide on the rails.

As part of the effort to reduce railroad car weight, the car builders and railroads have turned to some extent to building and using articulated cars, such as shown in U.S. Pat. Nos. 4,524,699; 4,233,909; 3,646,604 and 3,399,631. An articulated car has ends which are self-supported and hitchable to conventional non-articulated cars. An articulated car contains at least three units or platforms or elongated bodies with the adjacent ends of units connected together by an articulated connector supported by a single truck. In such a car there is always one more unit than articulated connectors.

Articulated cars at present are used primarily to transport containers and over-the-highway semi-trailers. In general, each unit or elongated body between hitches or articulated connectors is made long enough to carry the longest trailer or container in use although containers are very often double-decked.

In the case of container cars, a unit of such a car in a train may be (a) completely empty and not even carry one or two empty containers (b) carry one full container, with or without an empty container or (c) carry two full containers. Accordingly, the load carried by an articulated connector, joining two adjacent units of the car together, to the truck can vary from a minimum load when each unit is totally empty to a maximum load when each adjacent unit carries two containers with maximum allowable lading. The load on each truck in the articulated car, with the number of trucks being three or more, can vary within those extremes. Applying uniform braking force to the wheels of all the trucks as now done leads to simultaneous over-braking and under-braking of some truck wheels with undesirable results. A need thus exists for apparatus which will apply braking action correlated according to the load carried by a truck at the time of braking.

SUMMARY OF THE INVENTION

According to the invention there is provided a railroad freight car comprising a freight-carrying first elongated body supported at one end by a first truck and at the other end by a second truck; each truck having a plurality of wheels and carrying air pressure operated braking apparatus for braking the wheels; the air pressure operated braking apparatus on the first truck including a line for pressurized air and an air pressure sensor/changeover valve which governs the braking pressure applied to the wheels of the first truck; the first truck having a bolster, spring-supported at each end by wheel-containing side frames, whereby the bolster is lowered relative to the frame when the elongated body condition varies from empty to loaded; means mounting the air pressure sensor/changeover valve to the bolster; and the valve having means responsive to change in height of the bolster relative to the frame to decrease the air pressure to the brake apparatus from a high pressure when the elongated body is loaded to a lower pressure when an empty condition exists to thereby apply a predetermined braking force to the wheels when the elongated body is loaded and apply a decreased or lesser braking force to the wheels with an empty condition.

The sensor/changeover valve is set such that when the elongated body is loaded, high pressure air results in the application of full, i.e. 100%, braking pressure on the truck wheels. When the elongated body is empty or light, the sensor/changeover valve serves to reduce the air pressure applied to the truck braking system to a predetermined lower level which applies a lower braking pressure on the truck wheels. This lower pressure can be set at any fraction of the maximum pressure but most often will be in the range of 50 to 60% of maximum braking pressure.

Desirably, the air pressure operated braking apparatus on the second truck includes an air line having an air pressure sensor/changeover valve which governs the braking pressure applied to the wheels of the second truck; the second truck having a bolster, spring-supported at each end by wheel-containing side frames, whereby the bolster is lowered relative to the frame when the elongated body condition varies from empty to loaded; means mounting the air pressure sensor/changeover valve to the bolster; and the valve having means responsive to change in height of the bolster relative to the frame to increase the air pressure to the brake apparatus from a low pressure, when the elongated body is empty, to a high pressure when a maximum lading load is carried by the elongated body, to thereby apply a predetermined lower braking force to the wheels when the elongated body is empty and apply an increased braking force to the wheels with lading at maximum load.

Each truck used in the car can be a conventional four wheel truck as now used in the United States. Thus, each truck can have two axles supported by the side frames, and each axle can have two wheels.

When the railroad car is an articulated car, the first truck can support one end of the first elongated body, and one end of a second elongated body, through an articulated connector supported on the first truck bolster.

Also, the second truck can support the second end of the second elongated body, and one end of a third elongated body, through an articulated connector supported on the second truck bolster.

One or more of the trucks can have a side bearing support positioned on each side of the bolster center adjacent the truck side frames and the valve can be mounted directly on the bolster or on one of the side bearing supports.

The valve means responsive to change in height of the bolster relative to the side frame can be an arm extending from the valve into contact with the frame.

Also provided by the invention is a railroad car truck comprising a truck bolster supported at each end by springs mounted in two opposing rigid side frames in which a pair of axles containing two wheels each are mounted; the bolster being displaceable relative to the frames from maximum height when a tare weight load is applied to the bolster to a minimum height when a maximum lading load is applied to the bolster; the truck carrying air pressure operated braking apparatus for braking the wheels; the air pressure operated braking apparatus including a line for pressurized air, the line having an air pressure sensor/changeover valve which governs the braking pressure applied to the wheels of the truck; means mounting the air pressure sensor/changeover valve to the bolster; and the valve having means responsive to change in height of the bolster relative to the frame to decrease or lower the air pressure to the brake apparatus from a high pressure, when a substantially full load is applied to the bolster, to a lower pressure when a light or minimum load is applied to the bolster to thereby apply a predetermined braking force to the wheels when a capacity weight load is applied to the bolster and apply a decreased braking force to the wheels when empty or the load is light or minimum.

DETAILED DESCRIPTION OF THE DRAWINGS

To the extent it is reasonable and practical the same or similar elements which appear in the various views of the drawings will be identified by the same numbers. Also, unless otherwise stated in the following disclosure, all pipes are air carrying lines.

Figure 1:
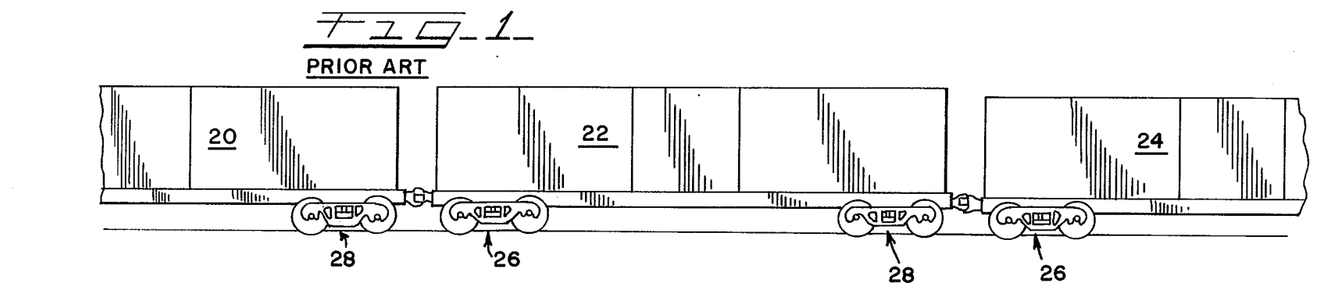
FIG. 1 is a side elevational view of a series of railroad cars coupled together in a conventional prior art train.

With reference to FIG. 1, each of the three railroad cars 20, 22 and 24 is separately supported at one end by a four-wheel truck 26 and at the other end by an identical four-wheel truck 28. Each of the pair of trucks 26, 28 is braked together at the same time without regard as to whether the load at each end of the car is the same or not.

Figure 2:
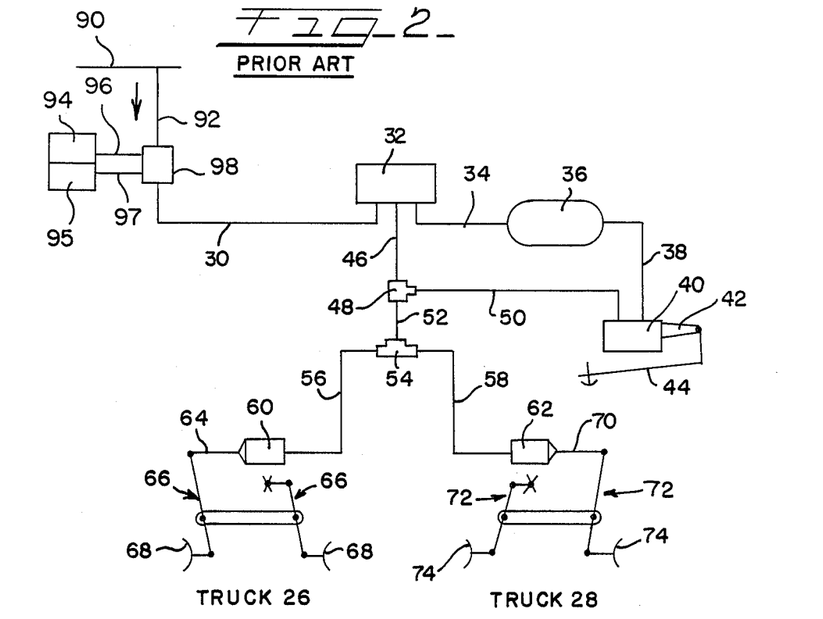
FIG. 2 is a schematic drawing of the braking system in present use on each car of a train such as illustrated in FIG. 1.

As shown in FIG. 2, the braking system on each of the cars shown in FIG. 1 includes a conventional brake pipe 90, branch pipe 92, control valve 98, auxiliary and emergency reservoirs 94 and 95 and pipes 96 and 97 from the reservoirs to the control valve 98. An air pipe 30 communicates with central valve 98 and with proportional valve 32. Pipe 34 communicates with proportional valve 32 and air equalizing reservoir 36. Pipe 38 extends from equalizing reservoir 36 to sensor valve 40 having operating ar 42 which is operated by lever 44. Also extending from proportional valve 32 is pipe 46 which communicates with Tee 48 as does pipe 50 which communicates with sensor valve 40. Pipe 52 extends from Tee 48 to Tee 54 from which pipe 56 extends to brake cylinder 60 and from which pipe 58 extends to brake cylinder 62. By means of piston rod 64 extending from cylinder 60 and lever arms 66 the brake shoes 68 are forced against the wheels of truck 26 to apply a braking action. Similarly, by means of piston rod 70 extending from cylinder 62 and lever arms 72 the brake shoes 74 are forced against the wheels of truck 28.

The described conventional braking system uses a single sensor valve 40 mounted on either truck 26 or truck 28 to simultaneously control the braking at both trucks and to apply the same braking pressure or level at both trucks. If the sensor valve 40 is located on the car body above truck 26 which is loaded and truck 28 is empty, the sensor valve 40 will show a loaded car condition and allow full air pressure to be applied by the brake cylinders to the brakes on both trucks. Since truck 28 is under light load conditions, the full brake cylinder pressure will cause an over-braking condition which can lock the wheels and cause them to slide and develop flat spots. If truck 26 is light and truck 28 is loaded, sensor valve 40 will show a light car condition and will allow a lower brake cylinder pressure for both trucks. Since truck 28 is loaded, this lower brake cylinder pressure will cause an under-brake condition and reduce ability of the vehicle to stop in a prescribed distance.

As indicated above, the prior art braking system used a sensor valve 40 that was mounted on the car body, as distinguished from the truck, above the truck frame which the valve was intended to contact to be operated, and the valve was positioned along the center line of the truck bolster. When the car rolled, the distance between the car body and the truck frame increased and decreased irrespective of the load on the truck. This caused the valve to be activated in a manner not responsive to the lading load thereby causing inaccurate braking pressure to be applied.

The above discussion of the prior art braking system, illustrated by FIG. 2, has been in conjunction with cars as shown in FIG. 1 in which each car is self-supporting by a truck at each end. However, the braking problems are even more pronounced with an articulated railroad car in which a single truck supports adjacent ends of separate units or platforms. This is because the load on the truck can be at a minimum or light, at maximum or heavy, or at any load between these limits.

Figure 4:
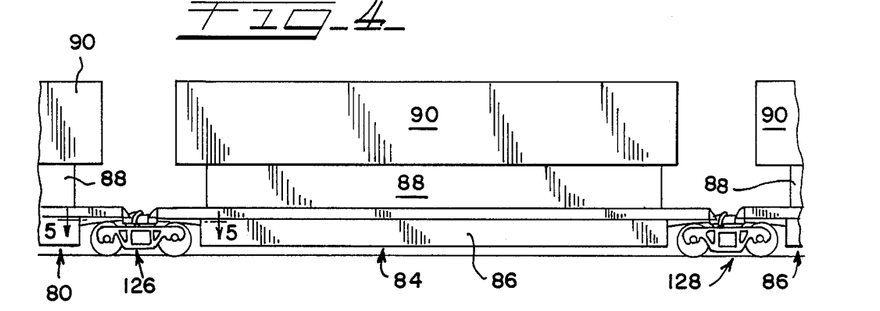
FIG. 4 is a side elevational view of an articulated train having a braking system according to the invention.

FIG. 4 illustrates an articulated railroad car having at least the three units 80, 82 and 84 which have similar deep well bodies 86. A container 88 fits partially in the well and a second, but slightly longer container, can be removably secured on top of lower container 90. It should be understood that articulated cars can carry any goods and be of any suitable shape. Besides being highly useful for transporting containers, they are especially useful when each unit is sized to carry a single over-the-highway trailer.

Each of the trucks 126 and 128 in the articulated car shown in FIG. 4 is substantially identical to each other and each truck jointly supports and couples together adjacent ends of two units 84 by means of an articulated coupler, such as shown in U.S. Pat. No. 3,646,604. The braking system for each of the trucks 126 and 128 is illustrated schematically in FIG. 3.

Figure 3:
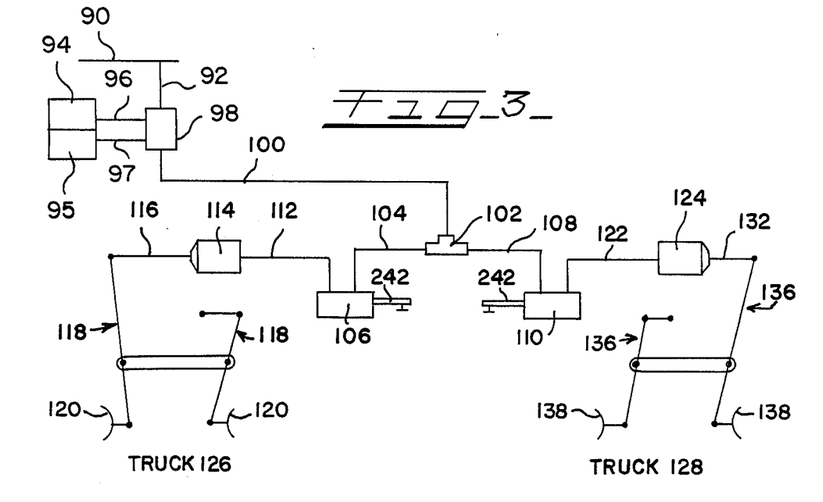
FIG. 3 is a schematic drawing of the braking system according to the invention in use on an articulated railroad train partially illustrated by FIG. 4.

As shown in FIG. 3, the braking system of the invention utilizes pressurized air received from conventional equipment required on all freight cars under current regulations including conventional brake pipe 90, branch pipe 92, control valve 98, auxiliary and emergency reservoirs 94 and 95 and pipes 96 and 97 from the reservoirs to the control valve 98. Air pipe 100 communicates with conventional control valve 98 and with Tee 102 from which pipe 104 extends to sensor/changeover valve 106 and from which pipe 108 extends to sensor/changeover valve 110. Sensor/changeover valve 106 is mounted on truck 126 and sensor/changeover valve 110 is mounted on truck 128. Each of the sensor/changeover valves is mounted on its associated truck in the same way. Pipe 112 extends from sensor/changeover valve 106 to brake cylinder 114. Piston rod 116 extends from cylinder 114 and operates levers 118 which force brake shoes 120 against the wheels of truck 126. In the same manner, pipe 122 extends from sensor/changeover valve 110 to brake cylinder 124. Piston rod 132 extends from cylinder 124 and operates levers 136 which force brake shoes 138 against the wheel of truck 128.

The braking system described in conjunction with FIG. 3 applies braking action on an individual basis to each truck based on the load which is applied to the truck and which load is sensed by the individual air pressure sensor/changeover valve mounted on that truck. Thus, the braking action of each truck is separately controlled. This desirable result is achieved by use of standard trucks readily available from several suppliers in the United States so that no significant increased cost for special equipment is involved. The air pressure sensor/changeover valve used can be obtained from Sloan Valve Company, Franklin Park, Ill. and is identified as Model 7200 Empty/load Brake Valve. This valve has a self-contained integral volume in which to store air when the car is empty, as is disclosed in Schmitt et al U.S. Pat. No. 4,648,661, to permit a pressure drop so that less than full available pressure is applied to the brake actuating means. When the car is empty the full air supply from the main reservoir is supplied by the valve to the brake actuating means.

This valve is designed to mount on the freight car ruck bolster between the side earing housing and the side rame. It's design enables it to easure the truck spring deflection nder loaded conditions and thus djust the brake cylinder pressure kcordingly. The valve is a completely self-contained unit, comprised of the inlet and outlet brake cylinder pipe mounting bracket, the integral equalizing volume reservoir, and the valve operating portion. This operating portion of the valve is actuated by a sensor arm extending outward from the valve body toward the side frame, contacting the side frame as the car is loaded. During light car braking application, brake cylinder air pressure flows into the Empty/Loan Valve where it is proportionally reduced as it flows to the brake cylinder and into the equalizing volume reservoir. At loaded car braking application, brake cylinder air pressure passes through the Empty/Loan Valve but is not reduced and no air enters the equalizing volume reservoir. Upon release of the brake, cylinder pressure flow back through the valve. There is no local brake cylinder pressure venting. The valve will not interfere with the normal release function of the car's retaining valve.

Figure 5:
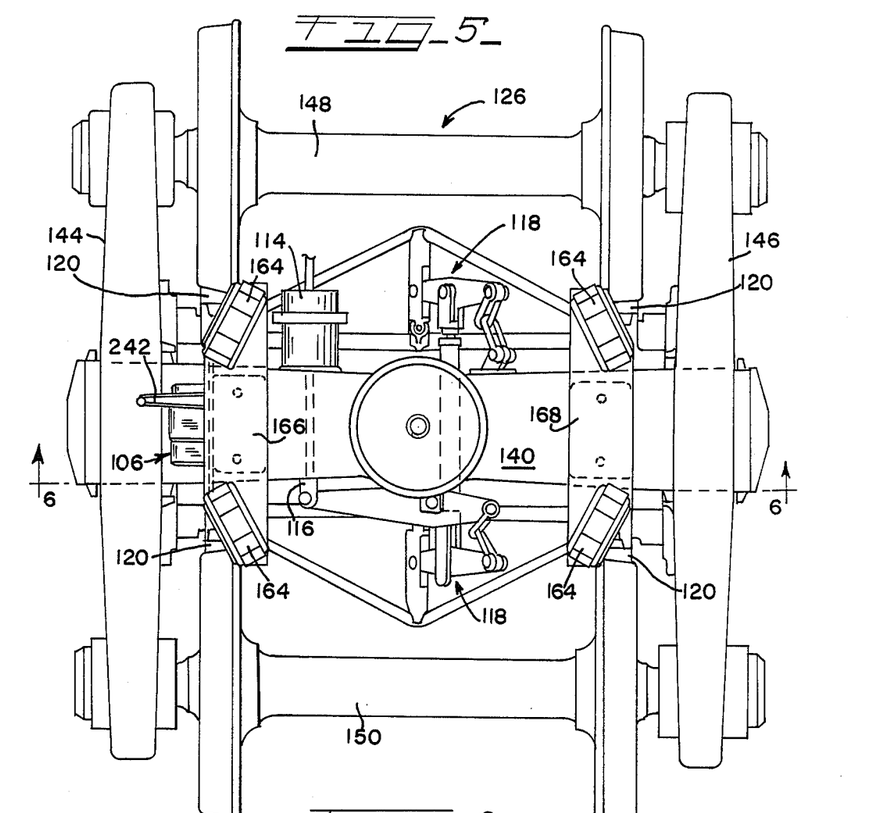
FIG. 5 is a view taken along the line 5—5 of FIG. 4.
Figure 6:
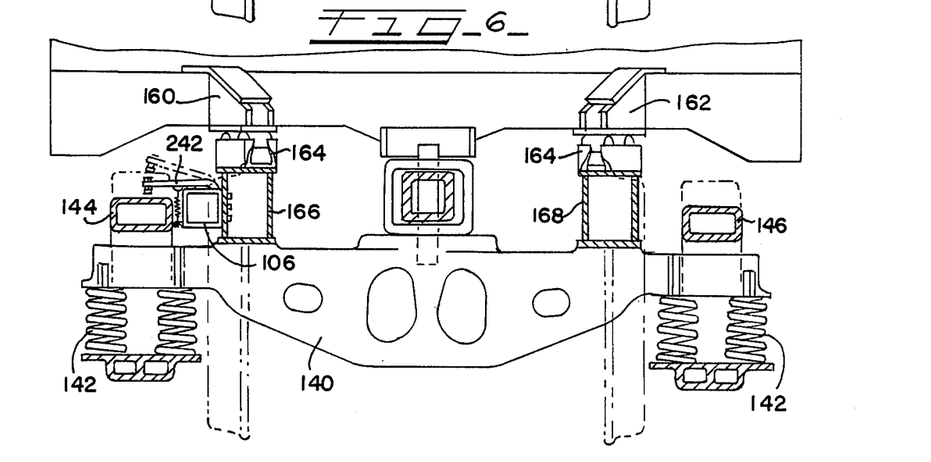
FIG. 6 is a sectional view taken along the line 6—6 of FIG. 5.
Figure 7:
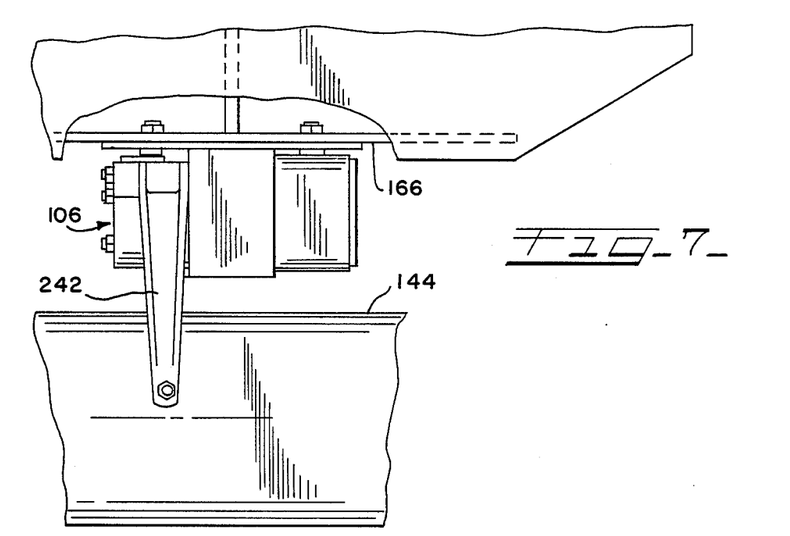
FIG. 7 is a plan view of the brake control valve shown mounted on the wheel truck in FIGS. 5 and 6.
Figure 8:
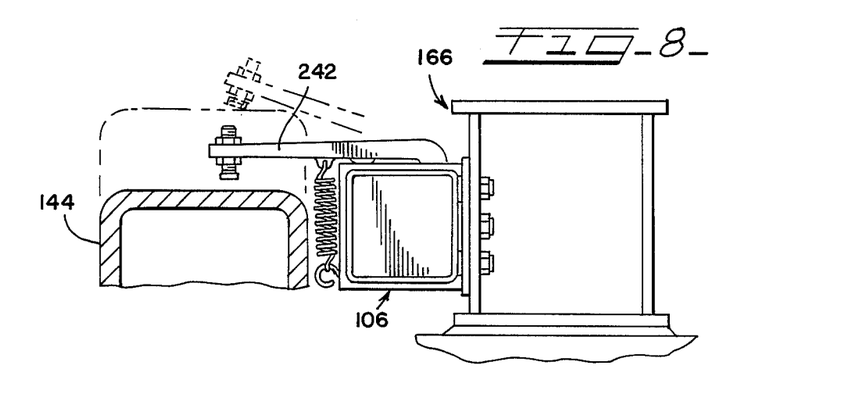
FIG. 8 is a side view of the valve shown in FIG. 7.

FIGS. 5 and 6 illustrate the truck 126 in greater detail, it being understood that trucks 126 and 128 are identical, and the location of the sensor/changeover valve 106.

Truck 126 includes a bolster 140 the ends of which ride on springs 142 in side frames 144 and 146. The axles 148 and 150 containing the wheels are mounted in the frames in the usual manner.

The ends of each unit 84 have a pair of side bearing support arms 160 and 162 (FIG. 6) which rest on side bearings 164 which are desirably of the Stucki type in wide commercial use. Side bearings 164 are located on top of fabricated assemblies 166 and 168 positioned on top of bolster 140. Each of the assemblies 166 and 168 supports two side bearings 164 (FIG. 5). The side bearing support arms 160 and 162 of a unit 84 are supported respectively by two side bearings 164 on the same side of the truck bolster axis.

Sensor/changeover valve 106 is mounted on the side of assembly 166 (FIGS. 5 to 8), above bolster 140, in the space between side frame 144 and the assembly 166. The arm 242 extending from sensor/changeover valve 106 extends over to and above the center of the top of side frame 144. When the load on truck 126 is light the end of arm 242 is slightly clear of contact with the side frame top. However, upon application of a load to the truck the bolster descends and the sensor/changeover valve 106 moves lower causing the arm 242 to contact the side frame top. As the load increases and the bolster descends further the arm 242 pivots upwardly and opens the valve 106 to thereby increase the pressure applied by the braking system to the brakes of that truck, but only that truck and no other truck.

By mounting the valve 106 on the truck, instead of the car or unit body, the adverse effect on the valve action caused by rolling of the car body is substantially reduced. This leads to more precise braking action.

By being able to control the braking pressure at each truck, irrespective of the braking pressure at any other truck, braking action as required by the applied load can be precisely applied.

Figure 9:
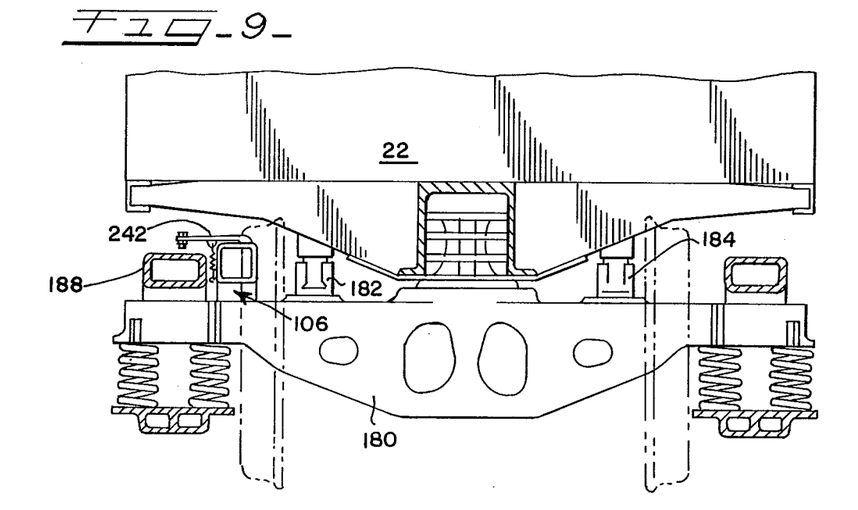
FIG. 9 is a vertical sectional view of a conventional wheel truck, such as shown on the cars in FIG. 1, equipped with an air pressure sensor/changeover valve of the same type illustrated in FIGS. 7 and 8 and which controls operation of the brakes on one truck by employing one-half the system shown in FIG. 3.

FIG. 9 illustrates the invention as applied to a conventional non-articulated railroad car (FIG. 1) having each end supported by a separate truck of conventional design. The truck bolster 180 has side bearings 182 and 184 which support the car body. Sensor/changeover valve 106 is secured to the top of bolster 180 adjacent truck side frame 188. The operation of the valve 106 and braking system is the same as previously described. It should be understood that each truck 26 and 28 is equipped with such a valve and auxiliary braking equipment as described in conjunction with FIG. 3.

The foregoing detailed description has been given for clearness of understanding only, and no unnecessary limitations should be understood therefrom, as modifications will be obvious to those skilled in the art.

What is claimed is:

1. A railroad freight car comprising:
   a freight carrying first elongated body supported at one end by a first truck and at the other end by a second truck;
   each truck having a plurality of wheels for carrying air pressure operated braking apparatus for braking the wheels;
   the air pressure operated braking apparatus on the first truck including a pressurized air line having an air pressure sensor/changeover valve, ahving a self-contained integral volume to store air when the cr is empty, directly through which pressurized air, supplied from conventional braking requipment required on freight cars by existing regulations and including an air control valve an auxiliary and emergency reservoirs, flows and which governs the braking pressure applied to the wheels of the first truck;
   the first truck having a bolster, spring supported at each end by wheel-containing side frames, whereby the bolster is lowered relative to the frame when the elongated body condition varies from empty to loaded;
   means mounting the air pressure sensor/changeover valve to the bolster; and
   the valve having means responsive to change in height of the bolster relative to the frame to directly decrease the air pressure of air supplied by the air line through the valve directly to the brake apparatus from a high pressure when the elongated body is loaded to a low pressure, which is a predetermined fraction of the high pressure, when an empty condition exists to thereby apply predetermined braking force to the wheels when the elongated body is loaded and apply a decreased braking force to the wheels with an empty condition.

2. A railroad car according to claim 1 in which:
   the air pressure operated braking apparatus on the second truck includes an air line having an air pressure sensor/changeover valve, having a self-contained integral volume to store air when the car is empty, directly through which pressurized air, supplied from conventional braking equipment required on freight cars by existing regulations and including an air control valve and auxiliary and emergency reservoirs flows and which governs the braking pressure applied to the wheels of the second truck;
   the second truck having a bolster, spring supported at each end by wheel-containing side frames, whereby the bolster is lowered relative to the frame when the elongated body condition varies from empty to loaded;
   means mounting the air pressure sensor/changeover valve to the bolster; and
   the valve having means responsive to change in height of the bolster relative to the frame to directly increase the air pressure of air supplied by the air line through the valve directly to the brake apparatus from a low pressure when the elongated body is empty, to a high pressure when a maximum load is carried by the elongated body, to thereby apply a predetermined lower braking force to the wheels when the elongated body is empty and apply an increased braking force to the wheels at maximum load, said low pressure being a predetermined fraction of the high pressure.

3. A railroad car according to claim 1 in which each truck is a four wheel truck.

4. A railroad car according to claim 2 in which each truck has two axles supported by the side frames, and each axle has two wheels.

5. A railroad car according to claim 1 in which the first truck supports one end of the first elongated body, and one end of a second elongated body, through an articulated connector supported on the first truck bolster.

6. A railroad car according to claim 2 in which:
   the first truck supports one end of the first elongated body, and one end of a second elongated body, through an articulated connector supported on the first truck bolster; and
   the second truck supports the second end of the second elongated body, and one end of a third elongated body, through an articulated connector supported on the second truck bolster.

7. A railroad car according to claim 5 in which a side bearing support is positioned on each side of the bolster center adjacent the truck frames and the valve is mounted on one of the side bearing supports.

8. A railroad car according to claim 7 in which the valve means responsive to change in height of the bolster relative to the side frame is an arm extending from the valve into contact with the frame.

9. A railroad car truck comprising:
- a truck bolster supported at each end by springs mounted in two opposing rigid side frames in which a pair of axles containing two wheels each are mounted;
- the bolster being displaceable relative to the frames from maximum height when a tare weight load is applied to the bolster to a minimum height when a maximum lading load is applied to the bolster;
- the truck carrying air pressure operated braking apparatus for braking the wheels;
- the air pressure operated braking apparatus including a line for pressurized air, the line having an air pressure sensor/changeover valve, having a self-contained integral volume to store air when the car is empty, directly through which pressurized air, supplied from conventional braking equipment required on freight cars by existing regulations and including an air control valve and auxiliary and emergency reservoirs, flows and which governs the braking presure applied to the wheels of the truck;
- means mounting the air pressure sensor/changeover valve to the bolster; and
- the valve having means responsive to change in height of the bolster relative to the frame to directly decrease the air pressure of air supplied by the air line through the valve directly to the brake apparatus from a high pressure, which applies maximum braking force when a loaded condition is applied to the bolster, to a lower pressure, which is a predetermined fraction of the high pressure, when an empty condition is applied to the bolster, to thereby apply a predetermined lower braking force to the wheels when an empty condition is applied to the bolster and to apply an increased braking force to the wheels when a loaded condition exists.

* * * * *

UNITED STATES PATENT AND TRADEMARK OFFICE
CERTIFICATE OF CORRECTION

PATENT NO. : 4,775,197

DATED : October 4, 1988

INVENTOR(S) : Robert A. Biegel

It is certified that error appears in the above-identified patent and that said Letters Patent is hereby corrected as shown below:

On the face sheet under "U.S. Patent Documents" insert:

| | | | |
|---|---|---|---|
| 1,615,366 | 1/1927 | Farmer | 303/22R |
| 2,098,129 | 11/1937 | Bell | 303/22R |
| 2,155,226 | 4/1939 | Renshaw | 303/22R |
| 2,179,399 | 11/1939 | Browall | 303/22RX |
| 2,396,431 | 3/1946 | McClure | 303/22R |
| 4,080,005 | 3/1978 | Engle | 303/23R |
| 4,417,767 | 11/1983 | Billeter | 303/23R |
| 4,648,661 | 3/1987 | Schmitt et al | 303/23R |

Column 4, line 53, change "central" to -- control --; line 57, change "ar" to -- arm --.

Column 6, line 10, change "wheel" to -- wheels --;

line 24, change "load" to -- Load --;

line 33, change "ruck" to -- truck --; change "earing" to -- bearing --;

line 34, change "rame" to -- frame --; change "easure" to -- measure --;

line 35, change "nder" to -- under --; change "djust" to -- adjust --;

line 36, change "kcordingly" to -- accordingly --;

UNITED STATES PATENT AND TRADEMARK OFFICE
CERTIFICATE OF CORRECTION

PATENT NO. : 4,775,197  
DATED : October 4, 1988  
INVENTOR(S) : Robert A. Biegel Page 2 of 2

It is certified that error appears in the above-identified patent and that said Letters Patent is hereby corrected as shown below:

lines 45 and 49, change "Loan" to -- Load --;

line 51, change "flow" to -- flows --.

Column 7, line 53, change "ahving" to -- having --;

line 55, change "cr" to -- car --;

line 56, change "requip-" to -- equip- --.

Signed and Sealed this

Twenty-first Day of February, 1989

Attest:

DONALD J. QUIGG

Attesting Officer

Commissioner of Patents and Trademarks